United States Patent Office 3,372,982
Patented Mar. 12, 1968

3,372,982
METHOD OF RECOVERY OF VANADIUM FROM ITS ORES
Wayne C. Hazen, Denver, Colo., assignor to Hazen Research Inc., Golden, Colo., a corporation of Colorado
No Drawing. Filed Mar. 1, 1963, Ser. No. 262,189
5 Claims. (Cl. 23—18)

This invention relates to a method for the recovery of vanadium from its ores, more particularly, it relates to an adsorption method for the recovery of vanadium from leach liquors and solutions of vanadium in general.

The method disclosed herein can be used in processes directed specifically to the recovery of vanadium or it can be used for the recovery of vanadium as a by-product of recovery processes directed to the recovery of other metals such as uranium. It includes the recovery of vanadium from any type solution, including solutions in leach liquors resulting from treatment of vanadium ores, solutions resulting from treatment of scrap metal and alloys of vanadium, and other solutions of vanadium.

In accordance with prior art procedures for the recovery of vanadium from its ores two methods have been used to reduce the vanadium to solution. One of these methods involves direct leaching of the ores with sulfuric acid and the other method involves roasting the ore at high temperatures with an alkaline salt, such as, soda ash or other reagent combinations, followed by leaching. Vanadium is also sometimes obtained in solution with uranium as a result of the treatment of uranium ores by either acid or alkaline leaching methods.

Regardless of how the vanadium is dissolved in recovering it directly from its ores or as a by-product in a recovery process for other ores, the subsequent recovery of vanadium from the solution in an economically feasible manner presents a number of problems. Vanadium is ordinarily recovered from the clear solution resulting from leaching either in the form of vanadium oxide or a sodium vanadate precipitate. The nature of the impurities dissolved from the ore and present in the solution with vanadium as well as the valence state of the vanadium in solution, and the varied reagents present, dictates the method used for forming the recovery precipitate.

In accordance with ordinary commercial practices, vanadium may be recovered from its commonly occurring ores by the solvent extraction process. In this process the ore is dissolved in sulfuric acid and the solution separated from the barren gangue either by filtration or countercurrent decantation. The vanadium, ordinarily present in the plus four valence state and associated with relatively large amounts of dissolved iron, is extracted from the solution by solvent extraction methods using an organic solvent such as alkyl phosphoric acid dissolved in kerosene. The extracted vanadium contained in the organic solvent is stripped with a strong sulfuric acid solution to give a concentrated vanadium sulfate solution in excess acid. The vanadium is then oxidized with a suitable oxidizing agent, such as sodium chlorate, and vanadium oxide precipitated from the solution in accordance with well known procedures of pH and temperature adjustments. The vanadium oxide precipitate is then filtered off, washed and fused at high temperature in a furnace to produce the article of commerce sometimes known as "Black Flake."

The above outlined prior art method is subject to a number of disadvantages. The equipment and reagent costs are excessively high and the procedures are quite complicated requiring precise control and supervision. One of the major difficulties is due to the presence of dissolved iron which, if present in the ferric state, is extracted with the vanadium during the solvent extraction step and contaminates the final product to such an extent that it is unfit for sale. To avoid this difficulty it has been common practice to reduce all ferric iron present in the leach liquor to the ferrous state by use of reducing agents, such as powdered iron, but this is a troublesome and expensive procedure.

Sometimes, depending upon various conditions such as type of impurities present, the vanadium and iron in the clarified leach liquor can be oxidized and different solvent extractants which are more selective for vanadium can be used, such as, a tertiary or quaternary amine in kerosene or other carrier. Under other conditions the vanadium may be recovered by precipitation methods. However, in all types of recovery, clear liquors must be used and they can only be obtained by the use of costly filters or thickeners to separate liquids from solids, prior to the solvent extraction or precipitation step.

Accordingly it is an object of this invention to provide an improved method for the recovery of vanadium from its ores.

It is also an object of this invention to provide an effective and relatively inexpensive method for the recovery of vanadium from leach liquors in general in the presence of other metals and impurities.

It is another object of this invention to provide a method for recovering vanadium from strip liquors which eliminates expensive and complicated steps, such as, clarifying the leach liquor and the use of solvent extraction procedures.

It is still another object of this invention to provide a method for the recovery of vanadium from leach liquors in the presence of iron and other metals in their various valence states.

It is another object of this invention to provide a method for the recovery of vanadium from its ores which is simple, relatively inexpensive, and highly dependable for realizing high percentage yields.

It has been found that the above and other objects can be accomplished by oxidizing the vanadium in the slurry resulting from the leaching of the ore to the pentavalent state, adjusting the pH of the slurry preferably within a range of about 1.5–3, adsorbing the vanadium on charcoal followed by stripping the vanadium from the charcoal and recovering it by precipitation from the resulting strip solution.

The process can be used effectively to recover vanadium from the various ores in which it commonly exists in nature. It is particularly useful for the recovery of vanadium as uranium is recovered from carnotite. The process is equally applicable to slurries obtained by acid or alkaline leach and can be used on slurries without separating the liquor from the solids. It is equally effective when used on clear leach solutions resulting from prior processing methods, such as, the raffinate from a uranium solvent extraction plant. It has been found to be effective upon leach solution and slurries containing other metals in any valence state such as, iron, and in the presence of a wide range of impurities without necessity of any clarification of the solution.

It is a requirement of the process that the vanadium be oxidized to its highest valence state, that is, plus five before the adsorption step. The oxidation agents used for accomplishing this oxidation are not critical as conventional oxidation agents, such as, sodium chlorate, sodium hypochlorite, hydrogen peroxide and others may be used or oxidation may be accomplished by electrolytic methods known in the art. The oxidation step is, of course, performed before adjustment of the pH value to the final desired value prior to the adsorption step.

Complete oxidation of the vanadium can be determined by standard methods well known in the art, such as, determination of the solution EMF, color of the solution, etc.

It is important that the slurry or solution containing dissolved vanadium be adjusted to the proper pH value before the adsorption step. For the best recovery yields under conditions normally occurring a pH range between about 1.0 and about 6.0 is required and a preferred range is between about 1.5 and 3 with almost theoretical yields being obtained with a pH range between 2.3 and 2.5. From a practical standpoint it is fortunate that a maximum adsorption occurs in a pH range which is easily obtained in acid leach liquors without added reagent cost caused by unwanted precipitation of insoluble hydroxides of iron, alumina, etc. However, when the process is applied to vanadium bearing alkaline liquors resulting from some vanadium hydrometallurgical processes, the advantage gained by lowering the pH to the value for maximum adsorption must of necessity be balanced against cost of acid required to do this. It is possible that operation at pH values as high as from 4 to 6 might be the most economical.

The preferred adsorbent material is charcoal and the type of charcoal used is not critical. Various types of activated charcoal now on the market of different hardness, particle size and activity may be used. Typical of these charcoals are those sold on the market as "Pittsburgh GW," "Nuchar," "Columbia Activated Carbon," and "Darco."

The time required for adsorption will, of course, be dependent upon the temperature, particle size of the charcoal and the vanadium concentration in the solution, these variables and their control being within the knowledge of the art. If increased speed is required, high temperatures will of course increase the speed at which vanadium is adsorbed, but care must be exercised to avoid the possibility of precipitation of iron vanadate before the vanadium is completely adsorbed, in solutions where iron is present. The preferred temperature can be determined for the particular system involved. It is obvious that the use of fine charcoal particles will accelerate the adsorption rate but here again the circumstances will dictate the particle size. For example, if the charcoal is to be used in a column, its fineness will be dictated by the solution flow requirements as is well known.

The charcoal may be used in various ways to perform the adsorption step. For example, if sulfuric acid is used to leach the vanadium-bearing ore the vanadium can be recovered from the resultant slurry after the oxidation step without separating the liquor from the solids, and the adjustment of the pH to a region between 1.5 and 2.5, by adding granular activated charcoal directly to the adjusted slurry. The granular charcoal will adsorb the vanadium after a certain time and the vanadium bearing charcoal can be screened out of the slurry, the vanadium stripped from it and the charcoal processed for reuse. The slurry may then be discarded or retreated for recovery of other values.

In the application of the process to recovering vanadium from the raffinate from a uranium solvent extraction plant the clear leach liquor is adjusted to a pH range between 1.5 to 3.0 after the vanadium oxidation step, and this solution passed through a column of fine activated charcoal to adsorb the vanadium on the charcoal in the column. The depleted solution can be discarded or reused as desirable. At periodic intervals when the charcoal is loaded with vanadium the solution flow is stopped and the adsorbed vanadium stripped from the charcoal by use of either a strong sulfuric acid solution or an alkaline stripping solution, such as, caustic or ammonia. Following the stripping the column is replaced in the stream for reuse.

Another method of using the charcoal as an adsorption agent for vanadium in strip liquors is to add finely divided charcoal to the strip liquor followed by agitation in an agitator to make a slurry of solution and powdered charcoal, resulting in the rapid adsorption of vanadium. The vanadium bearing charcoal is then removed from the liquor by filtration followed by stripping of the vanadium. The filter cake of charcoal can then be treated in an agitator containing regenerating solution and recovered by filtration for reuse.

The stripping reagent used for removing the adsorbed charcoal can be an alkaline reagent such as strong alkaline hydroxides, ammonia or ammonium hydroxide, or a strong acid, such as, 5% sulfuric acid. Conventional solvents for vanadium can be used. The vanadium in the strip solution in the pentavalent state, and in a highly purified and concentrated form, is precipitated very cheaply as a high purity product, such as, vanadium oxide or sodium vanadate, by any of the conventional precipitation procedures well known to the art.

The following examples are presented by way of illustration of the invention only and are not to be construed in any manner as limiting thereof.

*Example I*

A sample of vanadium-bearing sandstone assaying .8% $V_2O_5$ and weighing 200 grams was ground to −48 mesh and agitated for 24 hours at 150° F. in 400 cc. of solution containing 2% by weight of $H_2SO_4$. After this leaching step a small sample of the liquor was analyzed and found to contain 3.45 grams per liter of $V_2O_5$ and 1.8 grams per liter of Fe, indicating 86.5% solution of the $V_2O_5$.

Sodium chlorate was then added to the pulp until all the vanadium was oxidized to the pentavalent state, as evidenced by a solution EMF of −700 mv. when measured with a platinum electrode against a saturated KCL–calomel reference cell. The pH was then raised to 2.2 by slow addition of gaseous ammonia.

20 grams of +20 mesh "Darco" granular activated charcoal were added directly to the pulp and the mixture agitated gently for six hours at room temperature. The pulp was screened through a 28 mesh screen and the charcoal washed free of adhering slime with fresh water.

The washed charcoal was then agitated in 50 cc. of 5% $H_2SO_4$ for one hour, the solution decanted, a fresh portion of acid added to the charcoal and the mixture agitated for another hour. This solution was also decanted and the charcoal washed with water. The solutions were all combined and analyzed for $V_2O_5$ content. The total $V_2O_5$ found in the charcoal stripping solutions was 1.25 grams this amounting to a recovery of 91% of the $V_2O_5$ from the leach solution.

*Example II*

The following tests were made to determine the optimum pH range for the process.

250 cc. portions of acidic sodium vanadate solution assaying 5 grams per liter of $V_2O_5$ and containing 20 grams per liter of $Na_2SO_4$ were adjusted with NaOH to pH values ranging from .5 to 6.0. 10 grams of granular "Darco" activated charcoal were added to each solution and placed in a stoppered bottle on rolls for seven hours. At the end of this period the solution in each bottle was analyzed for $V_2O_5$ and the amount adsorbed on the charcoal determined by difference with the results shown in the following table.

| pH of Solution | Percent of $V_2O_5$ Adsorbed from Solution by Charcoal | Vanadium Content of Charcoal, percent $V_2O_5$ |
| --- | --- | --- |
| .5 | Trace | 0 |
| 1.0 | 34 | 4.3 |
| 2.4 | 92 | 11.5 |
| 4.7 | 56 | 7.0 |
| 6.0 | 35 | 4.4 |

The above results show that the most optimum pH is in the neighborhood of 2.4 and that a pH range between about 1 and about 6 is highly effective.

Example III

The following example is submitted for the purpose of illustrating the effectiveness of the process for recovering vanadium in the presence of iron in the ferric state and to illustrate the use of charcoal in a column.

A clarified leach liquor obtained by leaching a uranium-vanadium ore with sulfuric acid, and containing 1.2 grams per liter of $V_2O_5$ and 4 grams per liter of Fe, was treated by ion exchange techniques for uranium removal. The Fe was in the ferric state. The effluent was oxidized with sodium hypochlorite until the solution was bright yellow, indicating complete oxidation of the vanadium, after which is was adjusted with NaOH to a pH of 2.5.

This solution was passed slowly downward through a six inch deep bed containing 25 grams of —48 mesh "Pittsburgh GW" activated charcoal. Portions of the effluent solution were analyzed for vanadium until the issuing solution assayed the same as the feed solution, thereby indicating complete loading of the charcoal with $V_2O_5$.

The charcoal was washed by passing 2 bed volumes of water through the column. A solution of 5% $H_2SO_4$ stripping solution was then passed through the column slowly over a four hour period until no more $V_2O_5$ was in the strip liquor issuing from the column. This solution was analyzed for $V_2O_5$ and found to contain 2 grams of $V_2O_5$ showing that the charcoal had been loaded to 8.2% by weight of $V_2O_5$.

The acidic solution was heated and the pH raised to approximately 2 with gaseous $NH_3$ to precipitate a dark red vanadium oxide solid. This precipitate was filtered, washed and fused in an electric muffle. The fused product was analyzed with the following result.

|  | Percent |
|---|---|
| $V_2O_5$ | 99.1 |
| Fe | .5 |

The small percentage of iron present with the recovered $V_2O_5$ illustrates the effectiveness of the process for the selective adsorption of $V_2O_5$ in the presence of ferric iron. This is a decided advantage over prior art processes wherein complicated and expensive techniques such as the reduction of ferric iron to the ferrous state were necessary to recover vanadium in the presence of iron, of sufficient purity for a commercial product.

Example IV

The following example is submitted to illustrate the effectiveness of the process in recovering vanadium from an alkaline leach solution and to illustrate the use of charcoal in the process in powdered form.

An alkaline solution containing 5 grams per liter of $V_2O_5$ was obtained from the leaching of a salt (NaCl) roasted vanadium ore. The pH of one liter of this solution was lowered to 5.0 by addition of $H_2SO$.

One hundred grams of powdered "Nuchar" were added to the solution and the solution agitated for thirty minutes. The charcoal was then removed by filtration on a Buchner funnel and washed with water.

The vanadium was stripped from the charcoal by washing it repeatedly with 2% ammonium hydroxide solution. The strip liquor was analyzed for $V_2O_5$ and found to contain 4.6 grams of $V_2O_5$, showing a recovery of 92% of the vanadium in the solution. The charcoal filter cake remaining after stripping is available upon regeneration for reuse in the adsorption process.

The strip solutions from all of the above examples resulting from the stripping of adsorbed vanadium from charcoal were found to be extremely free of impurities. They were readily adaptable in each case to the recovery of vanadium therefrom by conventional precipitation methods.

The above examples illustrate that the invention provides a method for recovery of vanadium from leach liquors and solutions in general in the presence of other metals and impurities which is simple, economically feasible and highly dependable. It eliminates complicated and expensive procedures of prior art processes, such as, clarification of leach liquors, treatment of other metals in solution with vanadium to prevent their removal as impurities with the vanadium. In the majority of cases it replaces ion exchange and solvent extraction methods. It eliminates the use of expensive filtration and other type clarification equipment and procedures in that it is applicable to unclarified slurries and solutions.

Although the invention has been illustrated and described with reference to the preferred embodiments thereof, it is to be understood that it is in no way limited to the details of such embodiments, but is capable of numerous modifications within the scope of the appended claims.

What is claimed is:

1. A process for the recovery of vanadium from its ores which comprises: treating the ore with a solvent to bring the vanadium into solution; oxidizing the vanadium in solution to the pentavalent state; adjusting the pH of the solution to a value between about 1 and about 6; contacting the solution with charcoal to adsorb the vanadium; stripping the adsorbed vanadium from the charcoal with a solvent for the vanadium to form a substantially pure solution of vanadium and recovering the vanadium from the stripping solution by precipitation.

2. The process of claim 1 in which the pH is adjusted to a value between about 1.5 and about 3.

3. In the method for recovering vanadium from its ores in which the ore is leached with an acid to bring the vanadium into solution, the improvement which comprises oxidizing the vanadium in solution to the pentavalent state; adjusting the pH of the solution to a value between about 1 and about 6; contacting the solution with charcoal to adsorb the vanadium; stripping the vanadium from the charcoal with a solvent for the vanadium to form a substantially pure strip solution of vanadium; and recovering the vanadium from the strip solution by precipitation.

4. In the method of recovering vanadium from its ores in which the ore is salt roasted to produce an alkaline solution containing vanadium largely in the pentavalent state, the improvement which comprises adjusting the pH of the solution to a value between about 1 and about 6, adsorbing the vanadium on charcoal, stripping the vanadium from the charcoal with a solvent for the vanadium to form a substantially pure strip solution of vanadium; and recovering the vanadium from the strip solution by precipitation.

5. A method for the recovery of vanadium from solutions containing vanadium in the pentavalent state which comprises adjusting the pH of the solution to a value between about 1 and about 6; contacting the solution with charcoal to adsorb the vanadium on the charcoal; stripping the vanadium from the charcoal with a solvent for the vanadium to form a relatively pure solution of vanadium; and recovering the vanadium from the strip solution by precipitation.

References Cited

UNITED STATES PATENTS

| 2,221,683 | 11/1940 | Smit | 23—50 |
| 2,545,239 | 3/1951 | McQuiston et al. | 210—40 X |
| 2,819,944 | 1/1958 | Wibbles et al. | 210—39 X |

OTHER REFERENCES

Helbig: Article in Colloid Chemistry, vol. 6, edited by J. Alexander, Reinhold Pub. Corp., N.Y., 1946, pages 814–818.

OSCAR R. VERTIZ, *Primary Examiner.*

H. T. CARTER, *Assistant Examiner.*